Patented Feb. 1, 1938

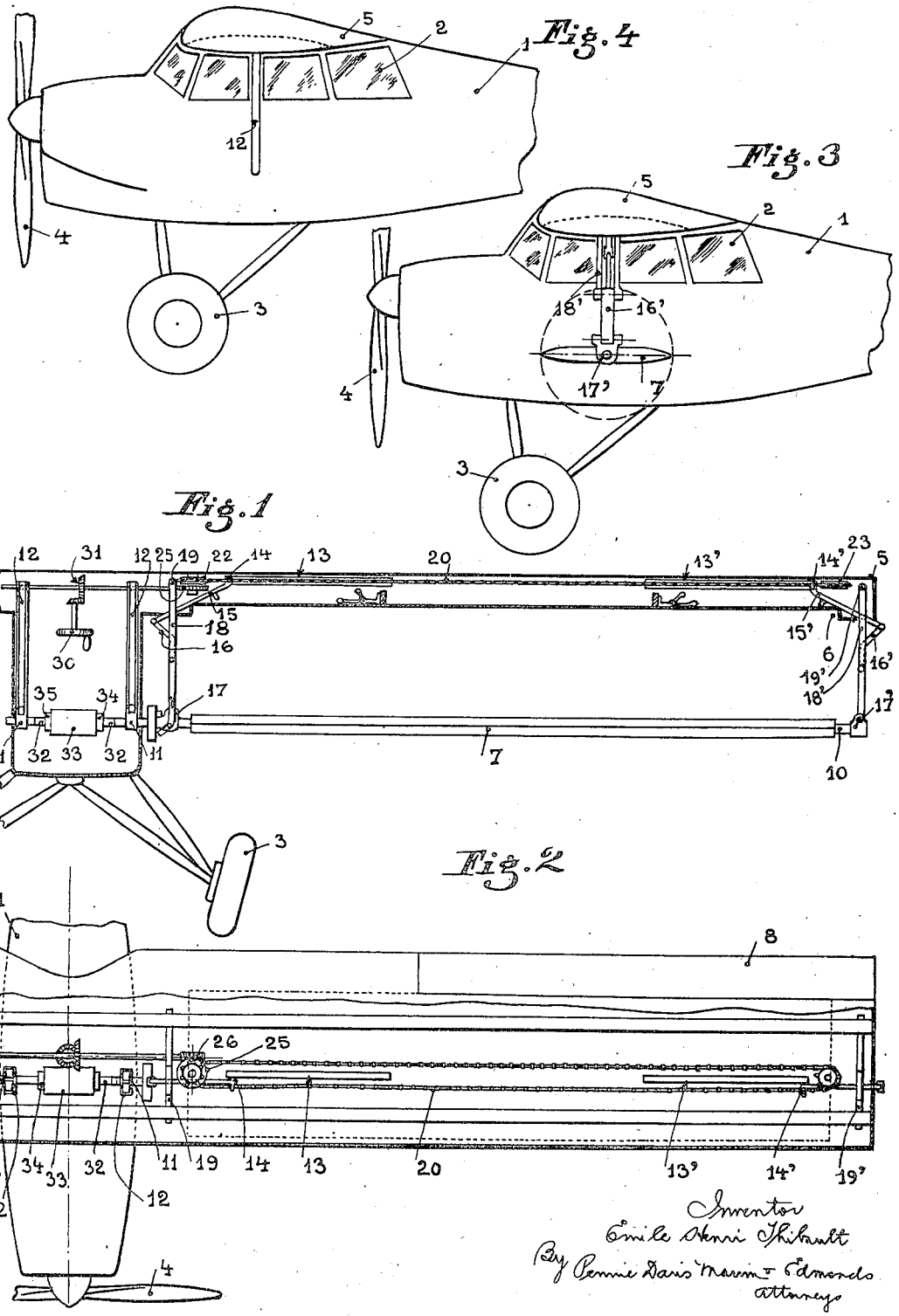

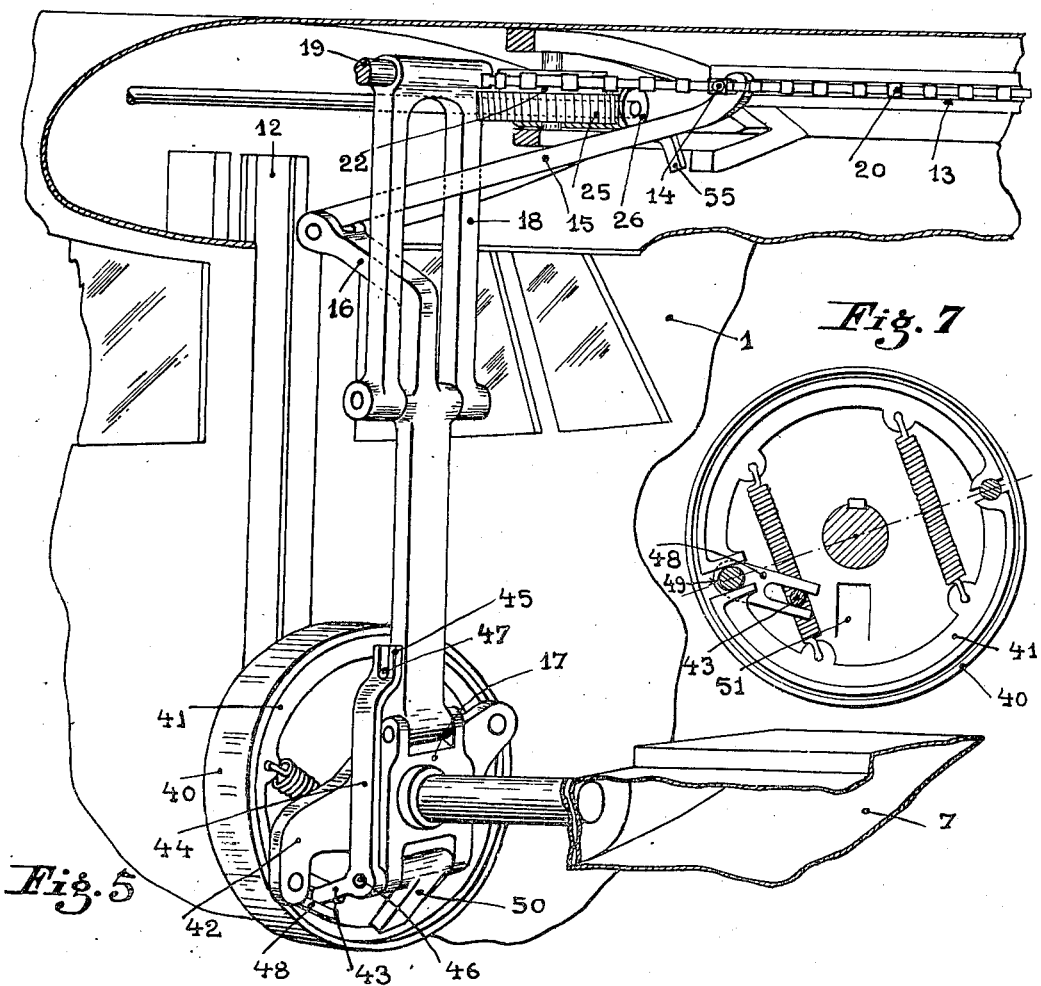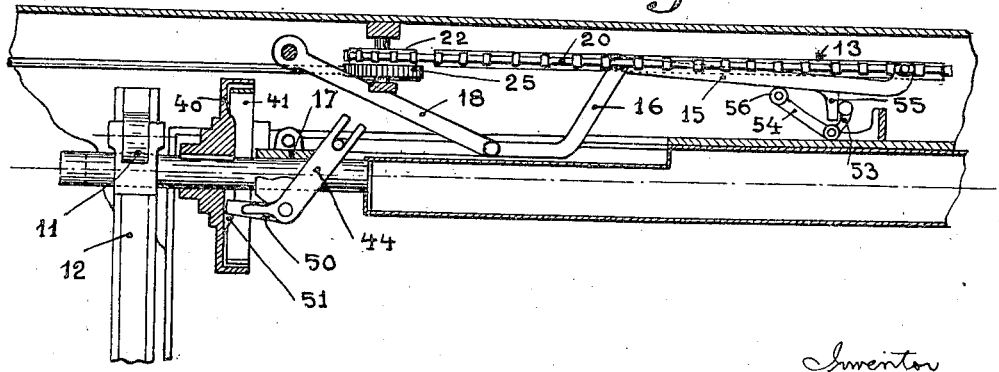

2,106,820

UNITED STATES PATENT OFFICE 2,106,820

FLYING MACHINE

Emile Henri Thibault, Paris, France

Application March 5, 1936, Serial No. 67,188
In France February 23, 1935

5 Claims. (Cl. 244—9)

The present invention has for its object a flying machine including, in addition to a complete airplane fuselage, with a cockpit or cabin, at least one fixed wing, carrying ailerons serving to the control of the machine, and at least one engine driving a propeller, a supplementary set of wings consisting of an elongated surface capable of turning about an axis transverse to the fuselage.

Such a set of wings, placed in an air stream, turns about its axis, in a self rotating manner, once it has been started, produces a lift much higher than that obtained with the same set of wings if the latter were stationary and fixed at the optimum angle of attack, and therefore permits of obtaining a minimum speed of the flying machine which is much lower than the usual minimum speeds, thus permitting slow flying and facilitating considerably landing and taking off and ensuring, when desired, a very good lateral stability of the apparatus, whereby stalling and lateral gliding are avoided.

My invention relates to apparatus of this type in which said set of wings can be applied against the fixed wing, so as to make with said fixed wing, a supporting surface of a section analogous to aerofoil sections employed for normal flying. This supplementary movable wing is arranged in such manner that it can be displaced with respect to said fixed wing, when desired, so as to be brought into a position permitting self revolution.

The drag, which is thus greatly reduced under normal flying conditions, permits high speeds and increases at will, preferably in an adjustable manner, when the movable wing is brought into its working position.

According to a preferred embodiment, I provide, besides means permitting to easily displace, during flight, the movable wing with a translatory motion so as to bring it into its working position and to start its rotation movement when it is in this position, means for braking said wing and locking it in the position in which it is applied against the fixed wing, these last mentioned means being preferably combined with the first mentioned means in such manner that all operations are performed through a single control.

The whole further includes a motor system, which advantageously consists of an electric motor, serving to start the self-rotation movement and which can serve to increase the speed of revolution of the movable wing, in such manner as to obtain, when so desired, an improved lift.

The invention can be applied to an airplane of any type, either with low wing or with high wing, the supplementary wing being applied to the upper or under surface of this wing.

A preferred embodiment of the present invention, as applied to a high wing monoplane, will be hereinafter described, with reference to the accompanying drawings, given merely by way of example, and in which:

Fig. 1 is a partial front view of a flying machine according to the present invention;

Fig. 2 is a corresponding plan view;

Fig. 3 is a corresponding side elevational view; these three views show the supplementary wing in its working position;

Fig. 4 is a side view corresponding to Fig. 3, the supplementary wing being in the normal flight position;

Fig. 5 is a perspective view of the mechanism controlling the displacements of the movable wing;

Fig. 6 is a longitudinal sectional view, on an enlarged scale, of the movable wing superposed to the fixed wing;

Fig. 7 is a front view of the brake drum.

In the embodiment shown by the drawings, the flying machine includes a fuselage 1 including a cabin 2, a landing gear 3, an engine driving a propeller 4, and a fixed wing 5, of usual section, disposed at the front part of the fuselage and provided, in the known manner, with ailerons 8 for the control of the airplane.

This fixed wing is provided, on either side of the machine, with a housing 6 intended for a supplementary wing 7. This supplementary wing consists of an elongated surface the profile or section of which is analogous to that of a normal airplane wing. It is carried by a spar 10 extending or not from one end thereof to the other end. This movable wing carries rollers 11 adapted to cooperate with a roller track 12 fixed to the side of the fuselage and which permits said wing to move between its position of rest, shown in Figs. 4 and 6 (in which it is arranged in its housing 6 provided in wing 5) and its working position, shown in Figs. 1, 2, 3 and 5, in which it is sufficiently distant from wing 1 for being able to turn about itself, as shown by the circle traced in dotted lines in Fig. 3.

The displacement of this movable wing from one position to the other is obtained through two identical mechanisms, disposed at either end of said wing, respectively, and simultaneously operated.

Each of these mechanisms includes a slideway 13, 13' located on the inside of the wing and in which a sliding element 14, 14' is movable. Each of these sliding elements is carried by the end of a lever 15, 15', pivoted at the other end to a bent lever 16, 16', which carries a bearing 17, 17' in which shaft 10 is journalled. An arm 18, 18' is jointed, on the one hand through a pivot 19, 19' to wing 5, and, on the other hand to bent lever 16, 16'.

It will be readily understood that it suffices to simultaneously displace sliding elements 14 and 14' along slideways 13, 13' for producing the lifting or the lowering of wing 7, parallelly to itself. This displacement is controlled by a chain 20 to which sliding elements 14 and 14' are secured, said chain being carried by two pulleys 23 and 23' fixed on the inside of wing 5.

Pulley 23, which is closer to the fuselage, is rigid angularly with a toothed wing 25 which cooperates with screw 26, fixed on transverse shaft 27, which also controls simultaneously the identical mechanisms located on the other side of the apparatus which relate to the symmetrical wing (with reference to the longitudinal plane of symmetry of the fuselage). The rotation of this shaft 27 is controlled through hand crank 30, located in the cabin, through bevel pinions 31.

The mere rotation of this crank 30 (or an equivalent organ) therefore permits of simultaneously bringing both wings, such as 7, located on either side of the fuselage, from their working positions into their positions of rest, and inversely.

The end of shaft 10 located on the side of the fuselage can engage, in the working position thereof, into the end of a shaft 32 provided with a notch for this purpose, whereby both shafts are angularly coupled together when they are in line with each other. This shaft 32 is in line with the driving shaft of an electric motor 33, with which it is coupled through a free wheel 34, this driving shaft 33 carrying, on the opposite side, an identical free wheel 35, through which it is connected with the part of the mechanism located on the other side of the fuselage.

Free wheels 34 and 35 are arranged in such manner as to permit of starting, and eventually driving, the movable wing from motor 33, said wing being subsequently allowed to move with a self revolution motion.

The whole also includes a brake drum 40, keyed on shaft 10 and cooperating with shoes or jaws carried by the frame of bearing 17 through a support 42. These jaws are moved away from each other, against the action of spring 52, through a finger 43 carried by the end of a lever 44 jointed to bearing 17 through a pivot 46, the other end of said lever carrying a fork 45 guided by a lug 47 fixed on lever 16.

The end of this finger 43 enters a housing of a lever 48 rigid with a cam 49 disposed between jaws 41 and devised in such manner that its rotation causes said jaws to be moved away from each other and to rub through their external surfaces against drum 40. Another finger 50 is keyed on pivot 46 and turns at the same time as lever 44.

A notch 51, intended to cooperate with this finger, is provided in the bottom of drum 40 and is arranged in such manner that, when finger 50 engages into it, wing 7 is locked in the position in which it is applied in housing 6.

The whole further includes a V-shaped lever including two arms 53 and 54 rigid with each other, said lever being pivoted inside wing 5 and cooperating with a stop 55 which projects from lever 15. A roller or the like 56 is disposed at the end of arm 54 and pushes lever 15 upwardly when stop 55 meets with the end of arm 53 (Fig. 5).

This device works in the following manner:

When the movable wing is in its position of rest (Fig. 6) finger 50 is in notch 51 and the jaws are tightened. The downward displacement of said wing under the action of the rotation of crank 30 produces, through the mere rotation of the levers, the disengagement of finger 50 and the release of the jaws, whereas the said wing, coming into its working position, causes shafts 10 and 32 to be coupled with each other.

It then suffices to start motor 33 for causing wing 7 to rotate with a self revolution movement.

The operation of crank 30 in the opposite direction first applies jaws 41 against drum 40, gradually slowing down this movement, then the engagement of finger 50 into notch 51, locking the movable wing in its position of rest. This wing is then again applied against the wing.

It will be readily understood that all these operations can be carried out very easily and very quickly while the machine is flying, and without any disturbance.

In a general way, while I have, in the above description, disclosed what I deem to be a practical and efficient embodiment of the present invention, it should be well understood that I do not wish to be limited thereto as there might be changes made in the arrangement, disposition and form of the parts without departing from the principle of the present invention as comprehended within the scope of the appended claims.

What I claim is:

1. A flying machine including a complete airplane fuselage, at least one fixed wing, two further wings symmetrically disposed with reference to said fuselage and adapted to be applied against two parts respectively of said fixed wing so as to make with said fixed wing a supporting surface of a section analogous to a normal aerofoil section, said further wings being mounted on symmetrically disposed axis for free and unlimited angular movement, transverse with reference to the fuselage, means for displacing together said further wings so as to be brought in a position permitting self rotation, a fixed motor adapted to cooperate with said axis and to start said self rotation, means for braking simultaneously said further wings and means for locking said wings in the position in which they are adapted to be applied against the fixed wing.

2. A flying machine as claimed in claim 1 wherein said means are combined in such manner that the corresponding operations are performed through a single control.

3. A flying machine as claimed in claim 1 in which said fixed wing is provided on each side with a housing intended for said further wings.

4. A flying machine as claimed in claim 1 in which said means for displacing said further wings includes on each side of the fuselage at least one sliding element, a slide way adapted to cooperate with said element, means for displacing said sliding elements along said slide ways, at least a bearing, a shaft carried by said bearing upon which is mounted said further wing, and a set of jointed levers between said sliding element, said bearing and said fixed wing respectively.

5. In a flying machine, the combination with a fuselage, a main fixed wing and at least one further wing freely rotatable upon a transverse axis, of means for displacing said further wing with reference to said fixed wing between a position permitting self rotation and a position in which said further wing is applied against at least a part of said fixed wing so as to make with said fixed wing a supporting surface of a section analogous to a normal aerofoil section, means fixed with reference to said main wing and designed to start said further wing in rotation when in said first named position, means for braking said self rotation and for locking said wing in a position in which it is adapted to be applied against the main fixed wing.

EMILE HENRI THIBAULT.